United States Patent [19]

Coles

[11] Patent Number: 5,712,679
[45] Date of Patent: Jan. 27, 1998

[54] SECURITY SYSTEM WITH METHOD FOR LOCATABLE PORTABLE ELECTRONIC CAMERA IMAGE TRANSMISSION TO A REMOTE RECEIVER

[76] Inventor: Christopher Francis Coles, 23 Clifton Road, Salisbury, Wiltshire, England, SP2 7BP

[21] Appl. No.: 720,865
[22] PCT Filed: Jan. 16, 1990
[86] PCT No.: PCT/GB90/00062
 § 371 Date: Sep. 11, 1992
 § 102(e) Date: Sep. 11, 1992
[87] PCT Pub. No.: WO90/08371
 PCT Pub. Date: Jul. 26, 1990

[30] Foreign Application Priority Data

Jan. 16, 1989 [GB] United Kingdom .................. 8900837
Jun. 2, 1989 [GB] United Kingdom .................. 8912788

[51] Int. Cl.⁶ ............................ H04N 7/20; H04N 7/18
[52] U.S. Cl. .............................. 348/158; 348/143
[58] Field of Search ........................ 358/108, 125, 358/126, 105, 109; 348/143, 158; H04N 7/18, 7/12, 7/20

[56] References Cited

U.S. PATENT DOCUMENTS

| | | | |
|---|---|---|---|
| 3,440,635 | 4/1969 | Hull | 340/527 |
| 4,001,805 | 1/1977 | Golbe | 340/527 |
| 4,445,118 | 4/1984 | Taylor et al. | 343/357 |
| 4,802,008 | 1/1989 | Walling | 348/13 |
| 4,814,711 | 3/1989 | Olsen et al. | 358/109 |
| 4,819,053 | 4/1989 | Halavais | 342/753 |
| 4,884,132 | 11/1989 | Morris et al. | 348/143 |

FOREIGN PATENT DOCUMENTS 0242099  10/1987  European Pat. Off. .
0651984  10/1985  Switzerland .

OTHER PUBLICATIONS

"Civil GPS from a Future Perspective", Thomas A. Stansell, Jr., Proceeding of the IEEE, vol. 71, No. 10, Oct. 1983.

Primary Examiner—Tommy P. Chin
Assistant Examiner—Vu Le

[57] ABSTRACT

A security system comprises a locatable portable electronic camera image transmission unit which both identifies its own location by utilising the capabilities of an integral position location apparatus module while at the same time electronically photographing and otherwise recording the immediate scene. This combined navigational and photographic information is at the same time both stored within the locatable portable electronic camera transmission unit and transmitted, along with any other desired information such as user name, address and time of day to a distant remote receiver. The remote receiver converts the transmitted navigational information into a display of the location of the locatable portable electronic camera transmission unit upon a map, and this navigational and the other visual information is suitably displayed upon a television screen and is also presented as a hard copy on a facsimile receiver. Thus the receiver of the transmitted information will have immediate knowledge of the exact navigational location of the locatable portable electronic camera transmission unit plus a visual and other record of the surrounding event.

12 Claims, 1 Drawing Sheet

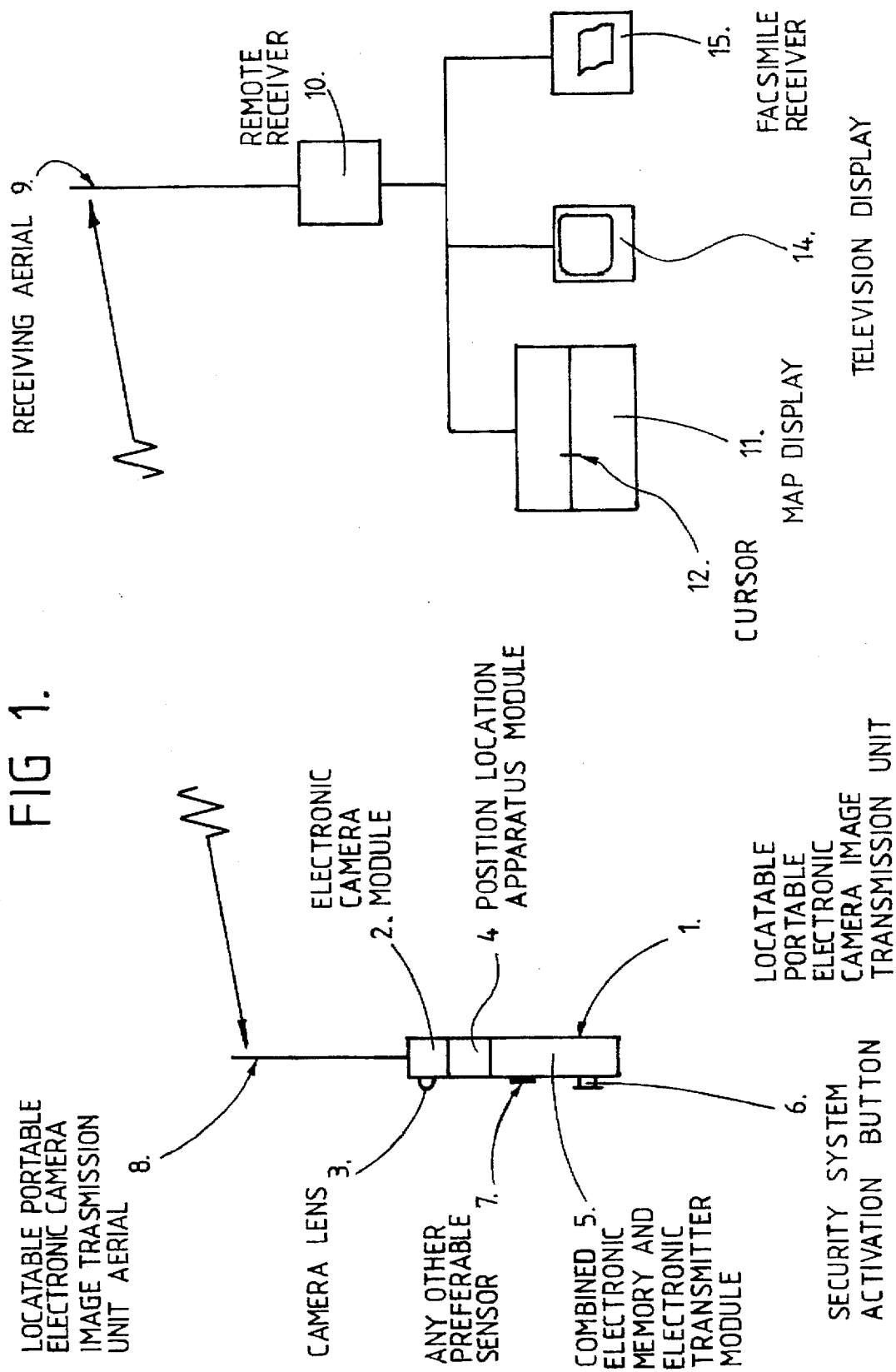

SECURITY SYSTEM WITH METHOD FOR LOCATABLE PORTABLE ELECTRONIC CAMERA IMAGE TRANSMISSION TO A REMOTE RECEIVER

THE FIELD OF THE INVENTION

The present invention relates to a photographic security system.

THE PRIOR ART

In U.S. Pat. No. 4,651,143 there is disclosed a security system including a television camera for taking a scene of a trespass upon a predetermined region at a site to be monitored, a video recorder for recording the image of the scene taken by the television camera, and a sensor for sensing a trespass and outputting a signal for starting the television camera and the video recorder. The signal output from the sensor for sensing a trespass and the outputs of a plurality of other sensors sensing other conditions at the site to be monitored are transmitted to a monitoring site remote from the site to be monitored for display at the monitoring site.

In EP-A-0242099 there is disclosed an anti-theft and locating system in which a microprocessor monitors vehicle personal position by way of coordinates obtained from Navstar Global Positioning System. Upon activation, through sensing unauthorized access to a vehicle or a change in its position, the microprocessor identifies itself to a central dispatch office and alerts the same to the nature of the disturbance. The system periodically updates vehicle location by way of digital signals sent to the central dispatch station by way of a cellular mobile telephone system. The central dispatch office can interrogate the microprocessor via the telephone link by addressing its unique serial number in order to obtain its position should the vehicle be stolen without activation of the microprocessor. A plurality of logic inputs and outputs are provided for accommodating conventional antivandalism and anti-theft detectors which may be integrated into the total protection system.

SUMMARY OF THE INVENTION

In accordance with the present invention there is provide a security apparatus comprising in combination an electronic camera and a transmitter for transmitting the image received by the electronic camera to a remote receiver characterised in that the apparatus is portable and includes a position location apparatus and in that the transmitter also transmits the positional information received from the position location apparatus.

The present invention also provides the combination of the aforesaid portable security apparatus and a remote receiving apparatus adapted to receive the information transmitted by the transmitter of the portable security apparatus.

BRIEF DESCRIPTION OF THE DRAWINGS

FIG. 1 shows a schematic of a security system in accordance with this invention consisting of a Locatable Portable Electronic Camera Image Transmission Unit and a remote receiver.

DESCRIPTION OF THE PREFERRED EMBODIMENT

The present invention will now be described, by way of example, with reference to FIG. 1 of the accompanying drawings which show schematically a portable photographic security apparatus of the present invention, in which the locatable portable electronic camera image transmission unit 1 is made up from a number of interconnected elements, each of which is known per se as a separate unit, namely an electronic camera module 2, with a camera lens 3, a position location apparatus module 4 in the form of a Global Positioning System (GPS) module 5 and a combined electronic memory and electronic transmitter module 5. The combined electronic memory and electronic transmitter module 5 preferably has a security system activation button 6 and provision is made for any other preferable sensor 7, for example, a microphone. This may be convenient to allow transmission of what may be heard being said. Again such a any other preferred sensor 7 may preferably activate the system if a loud noise such as a gunshot or scream takes place.

Any activation of the system will immediately cause the following to happen. One—calculation of the exact position of the portable locatable portable electronic camera image transmission unit 1 via the position location apparatus module 4. Two—activate as necessary the electronic camera module 2 to photograph the immediate area. Three—store all this information electronically within the internal electronic memory while at the same time transmitting, via the combined electronic memory and electronic transmitter module 5, name and address of the user, date, time of day, exact location, a photograph of the immediate area plus preferably sound.

All this information may preferably be transmitted using existing radio transmission systems, for example, cellular radio, via the locatable portable electronic camera image transmission unit aerial 8 to a receiving aerial 9 connected to a distant remote receiver 10. The remote receiver 10 may be in turn preferably connected to a map display 11. Map display 11 may preferably be so constructed as to be able to move a cursor 12 preferably in the form of a crosswire immediately to show the actual location of the locatable portable electronic camera image transmission unit 1 upon the map display 11. The remote receiver 10 may preferably be connected to a television display 14, thus giving direct display of any visual picture and sound transmission, along with the other location and user information. The remote receiver 10 may also preferably be connected to a facsimile receiver 15 giving a hard copy of the transmitted image and information.

At first glance this combination of modules would appear to need a substantial size external package to hold them all. A GPS system as proposed by Philip G. Mattos "Global Positioning by Satellite", Electronics & Wireless World, February 1989 still needs a package volume of 80 mm by 125 mm by 25 mm. However, the capacity of the electronics within such a GPS system are known to be vastly under-utilised. It is therefore possible to utilise this spare capacity to permit a substantial reduction of the volume mass of electronics which are required in the other modules. For example, the IMS T222 transouter (a new type of electronic chip) has the capacity of a 10 MIP parallel processing computer. Thus we can place all of the signal processing functions for all of the other modules onto such a transputer by simply scheduling any convenient sequence of software events to suit the particular needs.

The proposed use of such electronics may seem of itself to be obvious, but the resulting small package creates a range of completely new products and markets. For example, a child or young girl on the way to or from school will be able to alert his or her parents to any potential danger en route. An attractive and vulnerable young woman walking home at night can alarm the police (or indeed any convenient person) of potential as well as actual danger.

Thus the proposed portable photographic security system will provide substantially enhanced security to any person travelling while at the same time simple adaptions will make possible the use of such a system in any vehicle or building.

I claim:

1. A security system comprising in combination:
   a portable transmitter module adapted for selective transmission of a signal capable of being encoded with and conveying data;
   memory means within said portable transmitter module for storing data to be encoded in signals transmitted by said portable transmitter module;
   a receiver disposed in a location remote from said portable transmitter module, said receiver being adapted to receive signals transmitted by said portable transmitter module;
   means coupled to said receiver for interpreting data encoded in signals received by said receiver and presenting the data in a usable form;
   a camera module physically and electronically coupled to said transmitter module, said camera module having a lens for focusing an image and including means for converting the image into data representative of the image, the data being capable of being encoded into signals transmitted by said portable transmitter module;
   a global positioning module physically and electronically coupled to said transmitter module, said global positioning module being adapted to receive positioning signals from remote positioning transmitters, to calculate its current location based upon the received positioning signals, and to convert the calculated location into data capable of being encoded into signals transmitted by said portable transmitter module;
   audio receiver means coupled to said portable transmitter module, said audio receiver means being adapted to detect ambient sound and to convert the detected sound to data representative of the sound, the data being capable of being embedded within signals transmitted by said transmitter module;
   means in said portable transmitter module for receiving data from said camera module, said global positioning module, and said audio receiver means and for storing the received data in said memory means;
   means in said portable transmitter module for accessing data stored in said memory means and encoding the data in signals to be transmitted by said transmitter module and received by said receiver; and
   selective activation means for selectively activating said security system to cause image, position, and audio data to be captured, stored in said memory means, and transmitted in the form of a signal to be received by said receiver.

2. A security system as claimed in claim 1 and wherein said global positioning module is adapted to receive positioning signals from the Global Positioning Satellite (GPS) array.

3. A security system as claimed in claim 1 and wherein said means coupled to said receiver for interpreting data encoded in signals received by said receiver includes a map display and indicator unit for indicating on a map the location of a transmitter module as indicated by the location data encoded in a signal received from said transmitter module.

4. A security system as claimed in claim 1 and wherein said means coupled to said receiver for interpreting data encoded in signals received by said receiver includes a television display for displaying an image as encoded in a signal received from said transmitter module.

5. A security system as claimed in claim 1 and wherein said means coupled to said receiver for interpreting data encoded in signals received by said receiver includes a facsimile receiver for producing a hard copy of images encoded in signals received from said transmitter module.

6. A security system as claimed in claim 1 and wherein said selective activation means comprises a manually operable switch.

7. A security system as claimed in claim 1 and wherein said selective activation means comprises means for detecting an audio signal received by said audio receiver means and activating said security system when the magnitude of the detected audio signal exceeds a predetermined threshold.

8. A method of detecting a breach of security in a first location and providing information regarding the breach of security to security personal in a remote location, said method comprising the steps of:

(a) upon the breach of security, acquiring an image of the first location, converting the image into transmittable data representative of the image, and storing the data;

(b) upon the breach of security, acquiring a global positioning signal, calculating the position of the first location based upon the acquired global positioning signal, converting the calculated position into transmittable data representative of the position, and storing the data;

(c) accessing the stored data representative of the image and the position;

(d) generating a transmittable signal that contains the stored data;

(e) transmitting the signal to the remote location;

(f) receiving the signal at the remote location;

(g) extracting the data representative of the image and the position from the received signal;

(h) reconstructing the image and the position information from the extracted data; and (i) presenting the reconstructed image and position information in a form usable by security personal to identify the location and nature of the breach of security.

9. The method of claim 8 and further comprising, upon the breach of security, acquiring sounds from the vicinity of the breach, converting the acquired sounds into data representative of the sounds, and storing the data and wherein step (c) further comprises accessing the stored data representative of the sounds, step (g) further comprises extracting the data representative of the sounds, step (h) further comprises reconstructing the sounds, and step (i) further comprises presenting the sounds in a form usable by security personnel.

10. The method of claim 9 and further comprising initiating steps (a) through (i) by activating a manually operable switch.

11. The method of claim 9 and further comprising initiating steps (a) through (i) when the ambient sound in the vicinity of the breach of security exceeds a predetermined threshold.

12. The method of claim 8 and wherein step (b) comprises acquiring the global positioning signal from the Global Positioning Satellite (GPS) array.

\* \* \* \* \*